United States Patent
Zhang et al.

(10) Patent No.: US 11,922,658 B2
(45) Date of Patent: Mar. 5, 2024

(54) POSE TRACKING METHOD, POSE TRACKING DEVICE AND ELECTRONIC DEVICE

(71) Applicant: ARCSOFT CORPORATION LIMITED, Zhejiang (CN)

(72) Inventors: Long Zhang, Zhejiang (CN); Chao Zhang, Zhejiang (CN); Jin Wang, Zhejiang (CN)

(73) Assignee: ArcSoft Corporation Limited, Zhejiang (CN)

( * ) Notice: Subject to any disclaimer, the term of this patent is extended or adjusted under 35 U.S.C. 154(b) by 303 days.

(21) Appl. No.: 17/610,449

(22) PCT Filed: Apr. 9, 2020

(86) PCT No.: PCT/CN2020/083893
§ 371 (c)(1),
(2) Date: Nov. 11, 2021

(87) PCT Pub. No.: WO2020/228453
PCT Pub. Date: Nov. 19, 2020

(65) Prior Publication Data
US 2022/0222849 A1  Jul. 14, 2022

(30) Foreign Application Priority Data
May 14, 2019 (CN) .......................... 201910396914.7

(51) Int. Cl.
*G06T 7/73* (2017.01)

(52) U.S. Cl.
CPC ...... *G06T 7/74* (2017.01); *G06T 2207/10016* (2013.01); *G06T 2207/10024* (2013.01);
(Continued)

(58) Field of Classification Search
None
See application file for complete search history.

(56) References Cited

U.S. PATENT DOCUMENTS 10,284,794 B1 * 5/2019 Francois ................ H04N 23/64
10,802,147 B2 * 10/2020 Nerurkar ................ G06F 3/038
(Continued)

FOREIGN PATENT DOCUMENTS

| CN | 106780601 A | 5/2017 |
| CN | 107833270 A | 3/2018 |
| CN | 109410316 A | 3/2019 |

OTHER PUBLICATIONS

Human Motion Tracking by Multiple RGBD Cameras. Liu et al. (Year: 2017).*
(Continued)

*Primary Examiner* — Delomia L Gilliard
(74) *Attorney, Agent, or Firm* — Gang Yu

(57) ABSTRACT

A pose tracking method, a pose tracking device and an electronic device. The method comprises: acquiring continuous multiple images of a scanned object and an initial pose of an image capturing unit (S10); by taking the initial pose as an initial value, acquiring, on the basis of a previous frame image and a current frame image in the continuous multiple-frame images, a first calculated pose of the current frame image by using a first algorithm (S12); by taking the first calculated pose as an initial value, acquiring, on the basis of the current frame image and a current frame image reconstruction model, a second calculated pose of the current frame image by using a second algorithm (S14); and updating the initial pose of the image capturing unit according to the second calculated pose, and repeating the described steps to achieve pose tracking of the image capturing unit (S16).

20 Claims, 6 Drawing Sheets

(52) U.S. Cl.
CPC ............... *G06T 2207/10028* (2013.01); *G06T 2207/30244* (2013.01)

(56) References Cited

U.S. PATENT DOCUMENTS

2016/0327395 A1 11/2016 Roumeliotis et al.
2019/0325208 A1* 10/2019 Wang .................... G06V 20/52

OTHER PUBLICATIONS

International Search Report for corresponding application PCT/CN2020/083893 filed Apr. 9, 2020; dated Aug. 20, 2020.

* cited by examiner

POSE TRACKING METHOD, POSE TRACKING DEVICE AND ELECTRONIC DEVICE

CROSS-REFERENCE TO RELATED APPLICATION

The present disclosure claims priority to Chinese Patent Disclosure with priority No. 201910396914.7, entitled "Pose Tracking Method, Pose Tracking Device and Electronic Device", and filed to the China National Intellectual Property Administration on May 14, 2019, the disclosure of which is hereby incorporated by reference in its entirety.

TECHNICAL FIELD

The present disclosure relates to computer vision processing technology, and in particular, to a pose tracking method, a pose tracking device and an electronic device.

BACKGROUND

Three-dimensional reconstruction refers to constructing a digital three-dimensional model of a real object by acquiring a geometric shape and a material of the real object, so as to truly restore an outer shape of the object. An input thereof may be an image, a video stream, and three-dimensional point cloud captured in real time by using cameras of various types, and may also be an image, a video, and three-dimensional point cloud which have been captured. Three-dimensional reconstruction is widely applied in fields of computer aided geometric designs, computer animation, computer vision, medical images, virtual reality, augmented reality, digital media, etc.

Camera tracking is a core and key algorithm module in the three-dimensional reconstruction, and is used for estimating a camera pose at any time during photographing, the camera pose comprising a spatial three-dimensional position and an orientation. An accurate camera tracking result is a prerequisite for successful three-dimensional reconstruction. The existing real-time camera tracking methods have not good enough robustness, have a high requirement on the quality of input data, and have a lot of limitations on a photographing method of a user, not facilitating use by an ordinary user.

SUMMARY

According to one aspect of some embodiments of the present disclosure, a pose tracking method is provided. The method comprises the following steps: acquiring continuous multiple-frame images of a scanned object and an initial pose of an image capturing unit; by taking the initial pose as an initial value, acquiring, on the basis of a previous frame image and a current frame image in the continuous multiple-frame images, a first calculated pose of the current frame image by using a first algorithm; by taking the first calculated pose as an initial value, acquiring, on the basis of the current frame image and a current frame image reconstruction model, a second calculated pose of the current frame image by using a second algorithm; and updating the initial pose of the image capturing unit according to the second calculated pose, and repeating the described steps to achieve pose tracking of the image capturing unit.

Optionally, the initial pose of the image capturing unit is set as a unit matrix or randomly set as an arbitrary value.

Optionally, the continuous multiple-frame images are continuous RGB-D images.

Optionally, by taking the initial pose as an initial value, acquiring, on the basis of a previous frame image and a current frame image in the continuous multiple-frame images, a first calculated pose of the current frame image by using a first algorithm comprises: by taking the initial pose as the initial value, performing pixel-by-pixel color alignment on the previous frame image and the current frame image by using the first algorithm, to obtain a relative coordinate transformation between the previous frame image and the current frame image for acquiring a first calculated pose of the current frame image.

Optionally, by taking the first calculated pose as an initial value, acquiring, on the basis of the current frame image and a current frame image reconstruction model, a second calculated pose of the current frame image by using a second algorithm comprises: by taking the first calculated pose as the initial value, aligning the current frame image with the current frame image reconstruction model by using the second algorithm, to obtain a relative coordinate transformation between the previous frame image and the current frame image for acquiring a second calculated pose of the current frame image.

Optionally, the first algorithm is used for performing calculation on a low-resolution image, and the second algorithm is used for performing calculation on a high-resolution image.

Optionally, the initial pose of the image capturing unit is acquired by means of an inertial navigation module.

Optionally, a state quantity of the inertial navigation module is updated according to the second calculated pose, to update the initial pose of the image capturing unit.

Optionally, the initial pose of the image capturing unit is acquired by means of the inertial navigation module by using a multisensor fusion method.

Optionally, the inertial navigation module is an extended Kalman filter-based state estimation system.

Optionally, the method further comprises: verifying the second calculated pose, and when the verification is passed, updating the current frame image reconstruction model by using the second calculated pose and the current frame image.

Optionally, verifying the second calculated pose comprises: acquiring a comparison image from the current frame image reconstruction model, and comparing the comparison image with the current frame image, to achieve verification of the second calculated pose.

Optionally, the method further comprises: when the verification is passed, selecting a key frame image from frame images for which the verification is passed; and constructing a bag of words database on the basis of the selected key frame image.

Optionally, the method further comprises: when the verification fails, resuming pose tracking of the image capturing unit by using a relocation method.

Optionally, when the verification fails, the current frame image is marked as tracking failure; and when the number of frame images of continuous tracking failure exceeds a second threshold, it indicates that the pose tracking of the image capturing unit is lost, tracking of the image capturing unit is resumed by using the relocation method.

Optionally, the relocation method comprises: when the pose tracking is lost, calculating a bag of words vector of the current frame image; selecting a candidate key frame image according to the constructed bag of words database and the bag of words vector of the current frame image; acquiring a third calculated pose of the current frame image by using a third algorithm according to a relative pose between the candidate key frame image and the current frame image; and updating the initial pose of the image capturing unit according to the third calculated pose, to resume pose tracking of the image capturing unit.

Optionally, the method further comprises: initializing the inertial navigation module after resuming pose tracking of the image capturing unit.

According to another aspect of some embodiments of the present disclosure, a pose tracking device is provided. The device comprises: an image capturing unit, configured to acquire continuous multiple-frame images of a scanned object; an initial pose determination unit, configured to determine an initial pose of the image capturing unit; a first pose acquisition unit, configured to by taking the initial pose as an initial value, acquire, on the basis of a previous frame image and a current frame image in the continuous multiple-frame images, a first calculated pose of the current frame image by using a first algorithm; a second pose acquisition unit, configured to by taking the first calculated pose as an initial value, acquire, on the basis of the current frame image and a current frame image reconstruction model, a second calculated pose of the current frame image by using a second algorithm; and a pose update unit, configured to update the initial pose of the image capturing unit according to the second calculated pose, to achieve pose tracking of the image capturing unit.

Optionally, the initial pose determination unit is further configured to set the initial pose of the image capturing unit as a unit matrix or randomly set same as an arbitrary value.

Optionally, the continuous multiple-frame images are continuous RGB-D images.

Optionally, the first pose acquisition unit is configured to by taking the initial pose as an initial value, perform pixel-by-pixel color alignment on the previous frame image and the current frame image by using the first algorithm, to obtain a relative coordinate transformation between the previous frame image and the current frame image for acquiring a first calculated pose of the current frame image.

Optionally, the second pose acquisition unit is configured to by taking the first calculated pose as an initial value, align the current frame image with the current frame image reconstruction model by using the second algorithm, to obtain a relative coordinate transformation between the previous frame image and the current frame image for acquiring a second calculated pose of the current frame image.

Optionally, the first algorithm is used for performing calculation on a low-resolution image, and the second algorithm is used for performing calculation on a high-resolution image.

Optionally, the initial pose determination unit is an inertial navigation module.

Optionally, the pose update unit is further configured to update a state quantity of the inertial navigation module according to the second calculated pose, to update the initial pose of the image capturing unit.

Optionally, the inertial navigation module is configured to acquire the initial pose of the image capturing unit by using a multisensor fusion method.

Optionally, the inertial navigation module is an extended Kalman filter-based state estimation system.

Optionally, the pose tracking device further comprises: a pose verification unit, configured to verify the second calculated pose, and when the verification is passed, update the current frame image reconstruction model by using the second calculated pose and the current frame image.

Optionally, the pose verification unit is further configured to acquire a comparison image from the current frame image reconstruction model, and compare the comparison image with the current frame image, to achieve verification of the second calculated pose.

Optionally, the pose verification unit is further configured to select, when the verification is passed, a key frame image from frame images for which the verification is passed; and construct a bag of words database on the basis of the selected key frame image.

Optionally, the pose verification unit is further configured to resume, when the verification fails, pose tracking of the image capturing unit by using a relocation method.

Optionally, the pose verification unit is further configured to mark, when the verification fails, the current frame image as tracking failure; and when the number of frame images of continuous tracking failure exceeds a second threshold, it indicates that the pose tracking of the image capturing unit is lost, resume tracking of the image capturing unit by using the relocation method.

Optionally, the relocation method comprises: when the pose tracking is lost, calculating a bag of words vector of the current frame image; selecting a candidate key frame image according to the constructed bag of words database and the bag of words vector of the current frame image; acquiring a third calculated pose of the current frame image by using a third algorithm according to a relative pose between the candidate key frame image and the current frame image; and updating the initial pose of the image capturing unit according to the third calculated pose, to resume pose tracking of the image capturing unit.

Optionally, the initial pose determination unit is further configured to initialize the inertial navigation module after resuming pose tracking of the image capturing unit.

According to another aspect of some embodiments of the present disclosure, an electronic device is provided. The electronic device comprises: a processor; and a memory, configured to store executable instructions of the processor; wherein the processor is configured to execute the pose tracking method according to any one above by executing the executable instructions.

According to another aspect of some embodiments of the present disclosure, a storage medium is provided, the storage medium comprising a stored program, wherein the program, when running, controls a device where the storage medium is located to execute the pose tracking method according to any one above.

BRIEF DESCRIPTION OF THE DRAWINGS

The drawings illustrated herein are used for providing further understanding of some embodiments of the present disclosure and constitute a part of some embodiments of the present disclosure, and the illustrative embodiments of the present disclosure and illustrations thereof are used to explain some embodiments of the present disclosure, rather than constitute inappropriate limitation on some embodiments of the present disclosure. In the drawings.

DETAILED DESCRIPTION OF THE EMBODIMENTS

Figure 1:
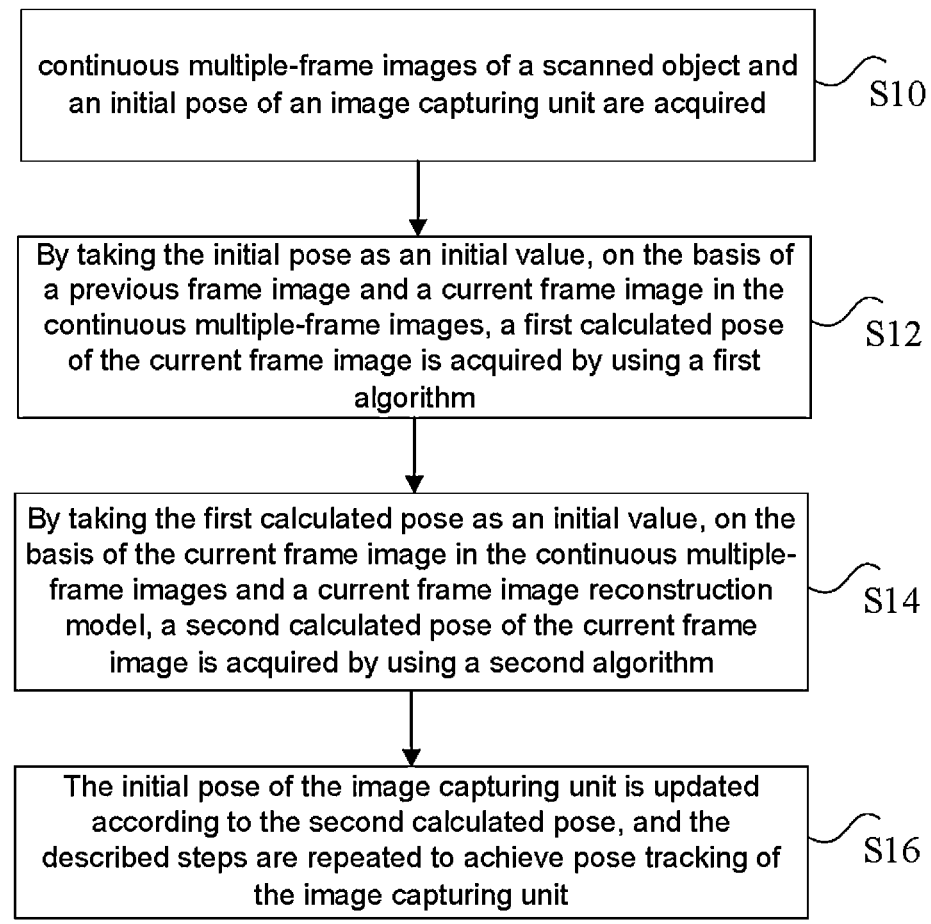
FIG. 1 is a flowchart of an optional pose tracking method according to some embodiments of the present disclosure.

In order to make a person skilled in the art better understand the solutions of some embodiments of the present disclosure, hereinafter, the technical solutions in the embodiments of the present disclosure will be described clearly and thoroughly with reference to the accompanying drawings of some embodiments of the present disclosure. Obviously, the embodiments as described are only some of the embodiments of the present disclosure, and are not all the embodiments. All other embodiments obtained by a person of ordinary skill in the art based on the embodiments of the present disclosure without any inventive effort shall all fall within the scope of protection of some embodiments of the present disclosure.

It should be noted that the terms "first", "second" etc. in the description, claims, and accompanying drawings of some embodiments of the present disclosure are used to distinguish similar objects, and are not necessarily used to describe a specific sequence or precedence order. It should be understood that the data so used may be interchanged where appropriate, so that the embodiments of the present disclosure described herein can be implemented in sequences other than those illustrated or described herein. In addition, the terms "comprise" and "have", and any variations thereof are intended to cover a non-exclusive inclusion, for example, a process, method, system product, or device that comprises a series of steps or units is not necessarily limited to those steps or units that are clearly listed, but may comprise other steps or units that are not clearly listed or inherent to such process, method, product, or device.

The embodiments of the present disclosure can be applied to a terminal mode, i.e. applied to cameras of various mobile devices (a smart phone camera, a digital camera, a single-lens reflex camera, a depth camera, a Pad camera, a laptop computer camera, a game machine camera, etc.); the embodiments can also be applied to a cloud-plus-terminal mode, i.e., applied to a computer system/server, which can operate with numerous other general-purpose or special-purpose computing system environments or configurations. Examples of well-known computing systems, environments, and/or configurations which are suitable for being used with a computer system/server comprise, but are not limited to, a personal computer system, a handheld or laptop device, a microprocessor-based system, a programmable consumer electronic product, a small-scale computer system, a large-scale computer system, and distributed cloud computing technology environments that comprise any of the described systems, etc.

The computer system/server may be described in a general context of computer system executable instructions (such as program modules) executed by a computer system. Generally, the program modules may comprise routines, programs, components, logic and data structures, etc., which perform particular tasks or implement particular abstract data types. The computer system/server may be implemented in a distributed cloud computing environment, and tasks are performed by remote processing devices that are linked through a communications network. In the distributed cloud computing environment, program modules may be located on local or remote computing system storage media comprising a storage device.

Hereinafter, the present disclosure will be described by means of detailed embodiments.

Embodiment I

According to one aspect of some embodiments of the present disclosure, a pose tracking method is provided. Referring to FIG. 1, FIG. 1 is a flowchart of an optional pose tracking method according to some embodiments of the present disclosure. As shown in FIG. 1, the method comprises the following steps:

S10: continuous multiple-frame images of a scanned object and an initial pose of an image capturing unit are acquired;

S12: by taking the initial pose as an initial value, on the basis of a previous frame image and a current frame image in the continuous multiple-frame images, a first calculated pose of the current frame image is acquired by using a first algorithm;

S14: by taking the first calculated pose as an initial value, on the basis of the current frame image in the continuous multiple-frame images and a current frame image reconstruction model, a second calculated pose of the current frame image is acquired by using a second algorithm; and S16: the initial pose of the image capturing unit is updated according to the second calculated pose, and the described steps are repeated to achieve pose tracking of the image capturing unit.

In some embodiments of the present disclosure, by means of the described steps, not only the pose of the image capturing unit can be accurately estimated, but also a substantially accurate pose can be provided when the scanned object deviates from the field of vision, thereby improving the robustness of pose tracking of the image capturing unit.

Hereinafter, the described steps will be described in detail.

Step S10: continuous multiple-frame images of a scanned object and an initial pose of an image capturing unit are acquired.

Optionally, in some embodiments of the present disclosure, the continuous multiple-frame images of the scanned object can be obtained by using the image capturing unit, and the image capturing unit may be an independent camera, or a camera integrated with a camera lens and an electronic device such as a mobile phone, and the type of the camera comprises an infrared structured light camera, a time-of-flight (ToF) camera, an RGB camera, a Mono camera, etc.; and the initial pose of the image capturing unit can be set as a unit matrix or randomly set as an arbitrary value, wherein the pose of the image capturing unit comprises a spatial three-dimensional position and an orientation of the image capturing unit, and has six degrees of freedom. The continuous multiple frame may be continuous RGB-D images, the RGB-D image is an image pair composed of a depth image and a color image, and the depth image and the color image are usually acquired respectively by means of different image capturing units; and it can be assumed that the color image and the depth image of each frame are synchronized in time, and for a color camera and a depth camera with fixed relative position, it is easy to implement data alignment by external parameter calibration to achieve frame synchronization of each color image and depth image by means of time stamps at which the images are acquired.

Step S12: by taking the initial pose as an initial value, on the basis of a previous frame image and a current frame image in the continuous multiple-frame images, a first calculated pose of the current frame image is acquired by using a first algorithm.

Optionally, in some embodiments of the present disclosure, the first algorithm is a three-dimensional point cloud alignment algorithm based on pixel-by-pixel color alignment, for example, a dense visual odometry (DVO) algorithm. By taking the initial pose as an initial value, pixel-by-pixel color alignment is performed on the previous frame image and the current frame image by using the first algorithm, and a relative coordinate transformation between the previous frame image and the current frame image can be obtained for acquiring a first calculated pose of the current frame image.

Step S14: by taking the first calculated pose as an initial value, on the basis of the current frame image and a current frame image reconstruction model, a second calculated pose of the current frame image is acquired by using a second algorithm.

Optionally, in some embodiments of the present disclosure, the second algorithm is an iterative three-dimensional point cloud alignment algorithm, for example, an improved iterative closest point (ICP) algorithm in a KinectFusion algorithm. By taking the first calculated pose as an initial value, the current frame image (for example, a depth image in an RGB-D image) is aligned with the current frame image reconstruction model by using the second algorithm, and a relative coordinate transformation between the previous frame image and the current frame image can be obtained for acquiring a second calculated pose of the current frame image.

Both step S12 and step S14 above can be summarized as solving a nonlinear least squares problem taking a transformation parameter of six degrees of freedom as an optimization target.

Step S16: the initial pose of the image capturing unit is updated according to the second calculated pose, and the described steps are repeated to achieve pose tracking of the image capturing unit.

Optionally, in some embodiments of the present disclosure, the initial pose of the image capturing unit in step S10 is updated according to the second calculated pose, and steps S12 and S14 are performed, and by continuously repeating the described steps, pose tracking of the image capturing unit can be achieved.

By means of the pose tracking method implemented in steps S10 to S16, as two different algorithms are used, accurate pose tracking of the image capturing unit can be achieved; moreover, in step S12, only the previous frame image and the current frame image are involved, being independent of a current frame image reconstruction model, and thus a substantially accurate pose can also be provided when the scanned object deviates from the field of vision, improving the robustness of pose tracking of the image capturing unit.

Optionally, in some embodiments of the present disclosure, in order to increase the calculation efficiency, a three-to-four-layer image pyramid can be established for the RGB-D image, the first algorithm (for example, a DVO algorithm) performs calculation on a low-resolution image, and the second algorithm (for example, an ICP algorithm) performs calculation on a high-resolution image, thereby reducing the complexity of the overall algorithm.

As a nonlinear least squares problem is solved by using an optimization method, a situation that the optimization result is incorrect may exist. Therefore, optionally, in some embodiments of the present disclosure, after step S14, the method can further comprise step S15: the second calculated pose is verified. Specifically, a comparison image can be acquired from the current frame image reconstruction model, and the comparison image can be compared with the current frame image (for example, the depth image of the current frame image) to achieve verification of the second calculated pose. Acquiring a comparison image from the current frame image reconstruction model may be using a light projection method to render a depth image from the current frame image reconstruction model as a comparison image. After the comparison image is acquired, the comparison image is compared with the depth image of the current frame image, a robust kernel function is used to calculate a weighted mean square error, and then the weighted mean square error is compared with a first threshold to achieve verification of the second calculated pose. when the verification is passed, determining the pose tracking of the image capturing unit is successful. Step S16 can further comprise updating the current frame image reconstruction model by using the second calculated pose and the current frame image. Otherwise, determining the pose tracking of the image capturing unit fails, and the reconstruction model is not updated.

Only the previous frame image and the current frame image are involved, being independent of a current frame image reconstruction model, and the first algorithm is implemented on a low-resolution image and the second algorithm is implemented on a high-resolution image, and thus the described pose tracking method provided according to some embodiments of the present disclosure has characteristics of high precision and high speed, but is not suitable for cases where the image capturing unit moves fast. when the image capturing unit moves too fast, the content difference between adjacent frame images is too large, a problem of motion blur will occur, which may cause failure of pose tracking of the image capturing unit.

Embodiment II

Figure 2:
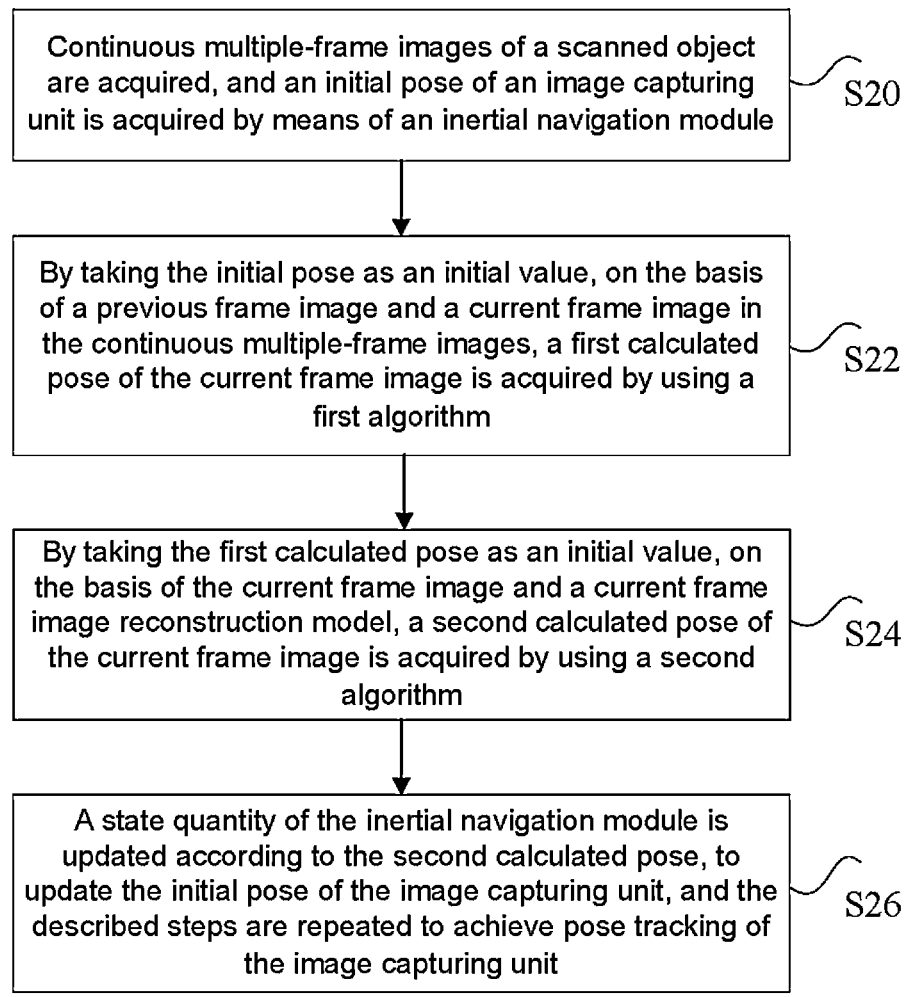
FIG. 2 is a flowchart of an optional inertial navigation module-based pose tracking method according to some embodiments of the present disclosure.

According to another aspect of some embodiments of the present disclosure, an inertial navigation module-based pose tracking method is also provided, so as to further improve the robustness of tracking of an image capturing unit. Referring to FIG. 2, FIG. 2 is a flowchart of an optional inertial navigation module-based pose tracking method according to some embodiments of the present disclosure. As shown in FIG. 2, the method comprises the following steps:

S20: continuous multiple-frame images of a scanned object are acquired, and acquiring an initial pose of an image capturing unit is acquired by means of an inertial navigation module;

S22: by taking the initial pose as an initial value, on the basis of a previous frame image and a current frame image in the continuous multiple-frame images, a first calculated pose of the current frame image is acquired by using a first algorithm;

S24: by taking the first calculated pose as an initial value, on the basis of the current frame image and a current frame image reconstruction model, a second calculated pose of the current frame image is acquired by using a second algorithm; and S26: a state quantity of the inertial navigation module is updated according to the second calculated pose, to update the initial pose of the image capturing unit, and the described steps are repeated to achieve pose tracking of the image capturing unit.

In some embodiments of the present disclosure, by means of the described steps, in addition to achieve accurate estimation of the pose of the image capturing unit, a substantially accurate pose of the image capturing unit can also be provided when the scanned object deviates from the field of vision; moreover, the inertial navigation module is independent of images, and thus will not be affected by motion blur, and therefore, the inertial navigation module-based pose tracking method provided in the present embodiment can also significantly increase the robustness of pose tracking of the image capturing unit in sharp movement situations. In addition, as the inertial navigation module has a small calculation amount, and compared with a method in which the initial pose of the image capturing unit is set as a unit matrix or randomly set as an arbitrary value, the inertial navigation module can be used to acquire a basically accurate initial pose of the image capturing unit, so that the speed of convergence can be optimized quickly, and the calculation performance can be improved.

Steps S22 and S24 above are basically the same as steps S12 and S14 in Embodiment I, and are not further described herein. Hereinafter, step S20 and step S26 will be described in detail.

Step S20: continuous multiple-frame images of a scanned object are acquired, and an initial pose of an image capturing unit is acquired by means of an inertial navigation module.

Optionally, in some embodiments of the present disclosure, the continuous multiple-frame images of the scanned object can be obtained by using the image capturing unit, and the image capturing unit may be an independent camera, or a camera integrated with a camera lens and an electronic device such as a mobile phone, and the type of the camera comprises an infrared structured light camera, a time-of-flight (ToF) camera, an RGB camera, a Mono camera, etc.; and wherein the pose of the image capturing unit comprises a spatial three-dimensional position and an orientation of the image capturing unit, and has six degrees of freedom. The continuous multiple frame may be continuous RGB-D images, the RGB-D image is an image pair composed of a depth image and a color image, and the depth image and the color image are usually acquired respectively by means of different image capturing units.

Optionally, in some embodiments of the present disclosure, the inertial navigation module is an extended Kalman filter (EKF)-based state estimation system. The inertial navigation module may obtain an initial pose of the image capturing unit through a dynamic integration method by using, as an input, data of an inertial measurement unit (IMU) commonly used in a mobile platform. The inertial measurement unit is a sensor for measuring a motion state by an inertial force. A common inertial measurement unit comprises an accelerometer for acquiring linear acceleration data and a gyroscope for acquiring angular velocity data. Considering that a common inertial measurement unit of a mobile platform has a large noise and a continuously changing offset, the error of a pose obtained by calculation directly based on an original measurement value is very large. Therefore, by taking the reading on the inertial measurement unit as a measurement value and using a multisensor fusion method, the prediction of Kalman filtering is completed by solving a dynamic equation, and the predicted pose serves as an initial pose of the image capturing unit. By using the multisensor fusion method, measurement results of various sensors and uncertainties can be considered red comprehensively to obtain a more accurate pose tracking result.

Optionally, in step S26, the state quantity of the inertial navigation module is updated according to the second calculated pose, wherein the state quantity may comprise position, speed and orientation of the inertial navigation module (for example, the accelerometer and the gyroscope), and the offset of the inertial navigation module, etc.

Similar to Embodiment I, after step S24, the method can further comprise step S25: the second calculated pose is verified. Specifically, a comparison image can be acquired from the current frame image reconstruction model, and the comparison image can be compared with the current frame image (for example, the depth image of the current frame image) to achieve verification of the second calculated pose. Acquiring a comparison image from the current frame image reconstruction model may be using a light projection method to render a depth image from the current frame image reconstruction model as a comparison image. After the comparison image is acquired, the comparison image is compared with the depth image of the current frame image, a robust kernel function is used to calculate a weighted mean square error, and then the weighted mean square error is compared with a first threshold to achieve verification of the second calculated pose. when the verification is passed, determining the pose tracking is successful. Step S26 can further comprise the current frame image reconstruction model is updated by using the second calculated pose and the current frame image. Otherwise, determining tracking of the image capturing unit fails, and the quantities of state of the reconstruction model and the inertial navigation module are not updated.

Thus, by updating the current frame image reconstruction model by using the second calculated pose and the current frame image, a three-dimensional model of the scanned object can be reconstructed.

Figure 3A:
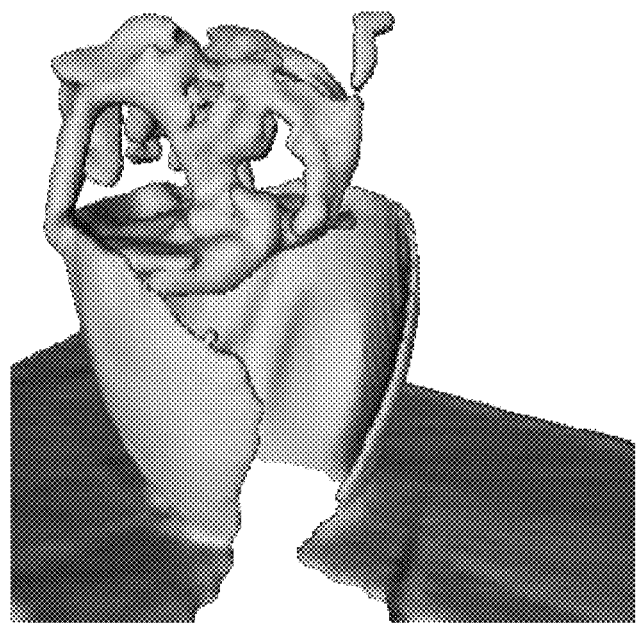
FIGS. 3a and 3b are respectively a three-dimensional model and a trajectory error graph generated by using a KinectFusion algorithm.
Figure 3B:
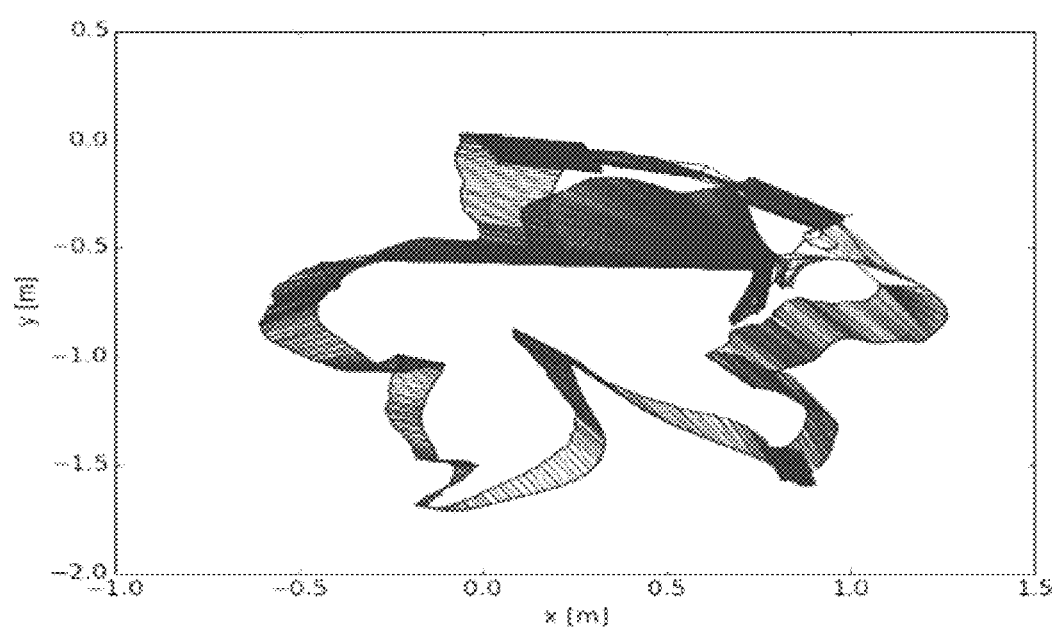

Referring to FIGS. 3a and 3b, FIGS. 3a and 3b are respectively a three-dimensional model and a trajectory error graph generated by using a KinectFusion algorithm. KinectFusion is a real-time three-dimensional reconstruction method based on infrared structured light input. A real-time camera tracking method used by KinectFusion is an improved iterative closest point (ICP) algorithm. Compared with the original ICP algorithm, KinectFusion uses a projection method to determine a corresponding point, instead of a step of calculating an accurate closest point, so that the calculation speed is significantly increased; on the other hand, KinectFusion always aligns an input depth image with the current frame image reconstruction model, which obviously reduces the accumulative error generated by alignment of adjacent frame images. However, for the KinectFusion algorithm, a tracking failure easily occurs in two situations: a first situation is that a handheld image capturing unit moves sharply, the KinectFusion method for determining a corresponding point by using a projection method is only applicable to a situation in which a camera moves slowly, a fast and random camera movement easily causes tracking loss, and the tracking loss means that a camera pose cannot be estimated, or an estimated camera pose is very different from an actual pose; and a second situation is that the scanned object deviates from the field of vision, and when a reconstruction model basically moves out of the field of vision of the camera, tracking loss will certainly occur in the KinectFusion method, and this situation is very easy to occur when an ordinary user performs photographing. It can be determined from FIGS. 3a and 3b that the three-dimensional model generated by using the KinectFusion algorithm has a large distortion degree, and the difference (as shown by the shaded region in FIG. 3b) between estimated pose and real pose of the image capturing unit in each frame of track error graph is also large.

Figure 4A:
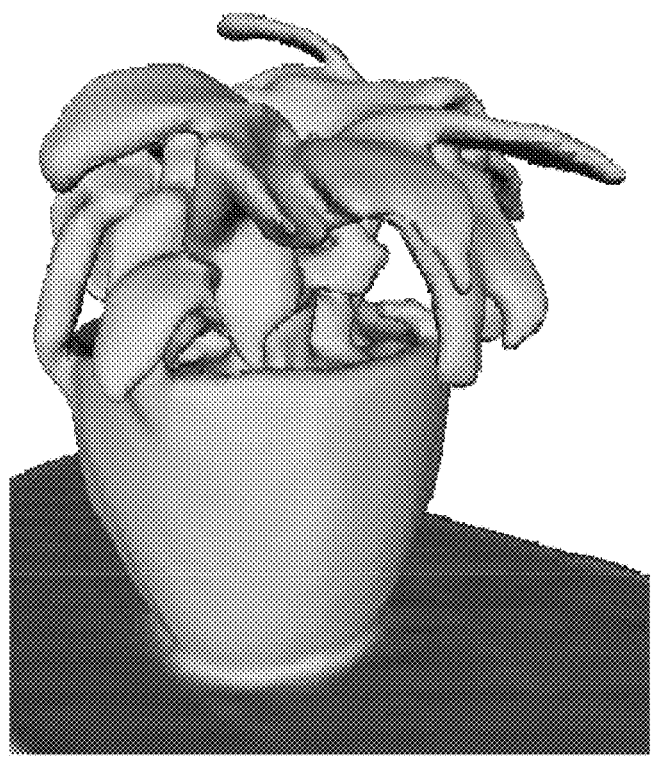
FIGS. 4a and 4b are respectively a three-dimensional model and a trajectory error graph generated by using an inertial navigation module-based pose tracking method provided in some embodiments of the present disclosure.
Figure 4B:
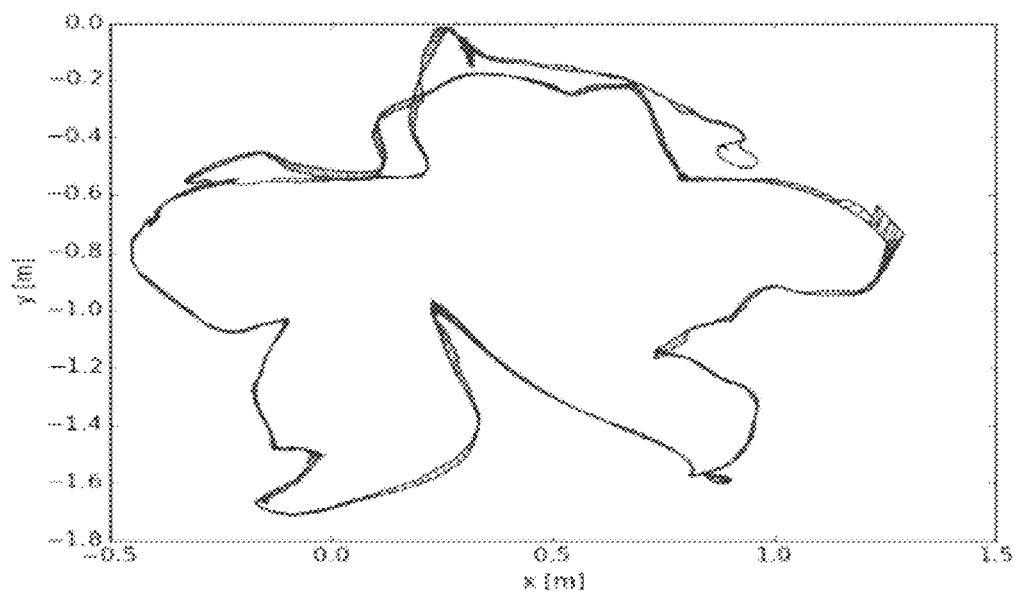

Referring to FIGS. 4a and 4b, FIGS. 4a and 4b are respectively a three-dimensional model and a trajectory error graph generated by using an inertial navigation module-based pose tracking method provided in some embodiments of the present disclosure. It can be determined that in cases where the handheld image capturing unit moves sharply, the inertial navigation module-based pose tracking method hardly causes tracking loss due to too fast movement of the image capturing unit, and this is mainly because the inertial navigation module uses high-frequency inertial measurement unit data, which can provide a relatively accurate initial pose. With regard to the case where the scanned object deviates from the field of vision, when the first algorithm is used to acquire a first calculated pose of the current frame image, only a previous frame image and a current frame image are involved, being independent of a current frame image reconstruction model, and therefore a substantially accurate pose of the image capturing unit can also be provided when the scanned object deviates from the field of vision, improving the robustness of pose tracking of the image capturing unit. Thus, a three-dimensional model generated by using an inertial navigation module-based pose tracking method can substantially truly restore the outer shape of an object (as shown in FIG. 4a), and the difference (as shown in the shaded region in FIG. 4b) between estimated pose and real pose of the image capturing unit in each frame of track error graph is also very small.

Although the described inertial navigation module-based pose tracking method significantly improves the robustness of pose tracking of an image capturing unit in situations such as sharp movement, the problem of pose tracking loss is still inevitable in cases where a user blocks a camera or a scene changes obviously.

Embodiment III

Figure 5:
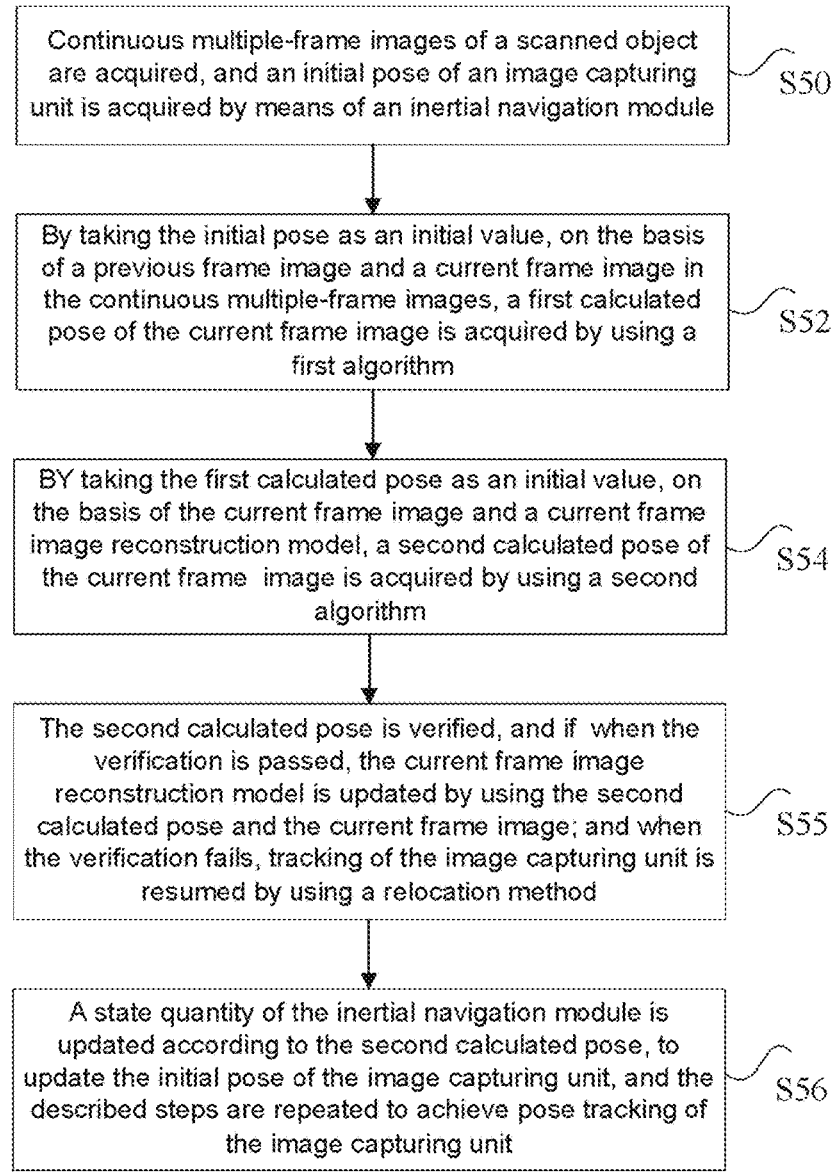
FIG. 5 is a flowchart of an optional pose tracking method comprising relocation according to some embodiments of the present disclosure.

According to another aspect of some embodiments of the present disclosure, a pose tracking method comprising relocation is also provided. The method can quickly resume pose tracking of an image capturing unit in the case of tracking loss, and reestimate the pose of the image capturing unit, so as to further improve robustness of pose tracking of the image capturing unit, and improve the user experience. Referring to FIG. 5, FIG. 5 is a flowchart of an optional pose tracking method comprising relocation according to some embodiments of the present disclosure. As shown in FIG. 5, the method comprises the following steps:

S50: continuous multiple-frame images of a scanned object are acquired, and an initial pose of an image capturing unit is acquired by means of an inertial navigation module;

S52: by taking the initial pose as an initial value, on the basis of a previous frame image and a current frame image in the continuous multiple-frame images, a first calculated pose of the current frame image is acquired by using a first algorithm;

S54: by taking the first calculated pose as an initial value, on the basis of the current frame image and a current frame image reconstruction model, a second calculated pose of the current frame image is acquired by using a second algorithm;

S55: the second calculated pose is verified, and when the verification is passed, the current frame image reconstruction model is updated by using the second calculated pose and the current frame image; and when the verification fails, tracking of the image capturing unit is resumed by using a relocation method; and S56: a state quantity of the inertial navigation module is updated according to the second calculated pose, to update the initial pose of the image capturing unit, and the described steps are repeated to achieve pose tracking of the image capturing unit.

The described steps S50, S52, S54 and S56 are basically the same as steps S20, S22, S24 and S26 in Embodiment II, and are not further described herein. Hereinafter, step S55 will be described in detail. In step S55, the second calculated pose is verified, and when the verification is passed, the current frame image reconstruction model is updated by using the second calculated pose and the current frame image, wherein the verification method may use the methods described in Embodiment I and Embodiment II. when the verification fails, determining the pose tracking fails, the state quantities of the reconstruction model and the inertial navigation module are not updated, and the pose tracking of the image capturing unit is resumed by using the relocation method. For example, when the verification fails, the current frame image can be marked as tracking failure; and when the number of frame images of continuous tracking failure exceeds a second threshold, it indicates that the pose tracking of the image capturing unit is lost, pose tracking of the image capturing unit is resumed by using the relocation method.

Optionally, in some embodiments of the present disclosure, the relocation method may comprise matching between feature points and bag of words (BoVV) to achieve quick resuming of pose tracking of the image capturing unit in the case of pose tracking lost. The bag of words is a method for describing image features by using picture feature point descriptors.

Specifically, step S55 can further comprise:

Step S550: when the verification is passed, a key frame image is selected from frame images for which the verification is passed.

Optionally, in some embodiments of the present disclosure, when the verification is passed, according to the second calculated pose, at every certain angle and distance, a clearest frame is selected, from several adjacent frame images for which the verification is passed, as the key frame image. For definition of an image, a low-pass filter can be used to perform smoothing processing on the image to obtain a blurred image. By comparing the difference between the original image and the blurred image, the blurriness of the blurred image can be obtained. The closer the original image is to the blurred image, the more blurred the original image itself is.

Step S551: a bag of words database is constructed on the basis of the selected key frame image.

Optionally, in some embodiments of the present disclosure, on the basis of the selected key frame image, image feature points can be extracted, feature point descriptors and bag of words vectors are calculated, and constructed into the bag of words database. The described bag of words database can be constructed in an offline manner, and an offline bag of words database is trained from a group of image sample sets by using a manner similar to text retrieval. Image features are similar to words, and the whole bag of words database is similar to a dictionary. By means of the dictionary, for any one feature, a word corresponding thereto can be found in the dictionary. First, image features and descriptors of each sample in the image sample sets are calculated, then the image features are clustered into words according to a Kmeans++ algorithm and divided into K types of subspaces, and clustering continues to be performed on the divided subspaces by using the Kmeans++ algorithm. According to the described cycle, the descriptors are clustered into a tree structure, wherein the whole tree structure constitutes the dictionary, and leaf nodes (also referred to as word nodes) of the tree constitute the words. Moreover, in the dictionary establishment process, for each word, the frequencies of occurrence of the word in all training images are also recorded, and the higher the frequency of occurrence is, the smaller the degree of discrimination of the word is to describe the degree of discrimination of image feature represented by the word.

In addition, in step S55, when the verification fails, tracking of the image capturing unit is resumed by using a relocation method comprises:

Step S552: when the pose tracking is lost, a bag of words vector of the current frame image is calculated;

Step S553: a candidate key frame image is selected according to the constructed bag of words database and bag of words vector of the current frame image;

Step S554: a relative pose between the candidate key frame image and the current frame image is calculated, and a third calculated pose of the current frame image is acquired; and Step S555: the initial pose of the image capturing unit is updated according to the third calculated pose, to resume pose tracking of the image capturing unit.

Optionally, in the described step S553 of some embodiments of the present disclosure, the similarities between bag of words vectors of all key frame images in the constructed bag of words database and the bag of words vector of the current frame image can be calculated, and key frame images having similarities exceeding a third threshold are used as candidate key frame images. Specifically, when the similarities are calculated, first, all key frame images which share word nodes with the current frame image can be screened out in the constructed bag of words database, and serve as candidate key frame images after the first screening, and meanwhile, the maximum number of shared word nodes of the candidate key frame images is calculated. Then, the minimum threshold of the shared word nodes is set as 0.8 times the maximum number, key frame images, the number of shared word nodes of which is less than the minimum threshold are filtered out, and the remaining key frame images serve as candidate key frame images after the second screening. Then, each of the candidate key frame images after the second screening and key frame images with similar positions thereto are combined into a candidate key frame image group, a sum of similarity scores between the candidate key frame image groups and the current frame image is calculated by means of bag of words vectors, and those key frame images with total scores higher than a fourth threshold (for example, 0.75 times the highest total score) are screened out as the finally screened candidate key frame images.

Optionally, in the described step S554 of some embodiments of the present disclosure, for each candidate key frame image, descriptors matching the current frame image are screened out, and then mismatching pairs are filtered out by using a random sample consensus (RANSAC) algorithm. When the frame depth of the current frame image is known, through sparse feature point matching pairs between the candidate key frame image and the current frame image, a third algorithm (for example, a PnP algorithm) is used to calculate a relative pose between the candidate key frame image and the current frame image, and acquire a third calculated pose of the current frame image. when the number of feature point matching pairs obtained by screening is greater than a fifth threshold, the pose resuming is successful, and the initial pose of the image capturing unit in step S50 is updated according to the third calculated pose. In this way, relocating of the image capturing unit can be achieved, and pose tracking of the image capturing unit can be resumed.

In cases where pose tracking of the image capturing unit is lost, as the inertial navigation module cannot obtain feedback for a long time, the system state thereof is very likely to deviate far from a real value. To this end, when the relocation of the image capturing unit is successful and pose tracking of the image capturing unit is resumed, the inertial navigation module needs to be re-initialized, which comprises setting external parameters, offsets and variance matrices of the inertial navigation module as default values, and the pose of the current frame image is used to reversely obtain an initial pose of the inertial navigation module, etc.

In order to test the effectiveness of the relocation method, experiments were conducted for three different situations. I. A handheld image capturing unit is away from a scanned object, and then moves along an arbitrary route for several seconds to several minutes and then returns to the original photographing scene. II. A lens of an image capturing unit is completely blocked during a photographing process, and released after a period of time. III. In a photographing process, a lens of an image capturing unit is completely blocked, and while keeping the blocking state, the image capturing unit is moved for a period of time according to any route, and then the image capturing unit substantially returns to the original photographing point. In the three situations, the pose tracking of the image capturing unit can be resumed in less than 1 second by using the pose tracking method comprising relocation, which fully satisfies the application requirements.

According to the described pose tracking method provided in some embodiments of the present disclosure, not only the pose of the image capturing unit can be accurately estimated, but also a substantially accurate pose can be provided when the scanned object deviates from the field of vision, and on the basis of the concept of multisensor fusion, by integrating inputs of the inertial navigation module and the image capturing unit, a more robust pose tracking is achieved for an image capturing unit, especially the robustness of pose tracking in the case of sharp movement. Moreover, in cases where the camera tracking is lost, effective scene regain can be provided through the relocation method, and the pose tracking of the image capturing unit can be quickly resumed. In addition, the described pose tracking method is particularly suitable for a mobile platform: on the one hand, the method makes full use of a variety of sensor devices commonly used in a mobile platform; and on the other hand, the method has relatively low calculation cost, and satisfies the real-time calculation performance requirements of the mobile platform.

According to the described pose tracking method provided in some embodiments of the present disclosure, in addition to be able to achieve three-dimensional reconstruction of a scanned object, the method is also applicable to an augmented reality application.

Embodiment IV

Figure 6:
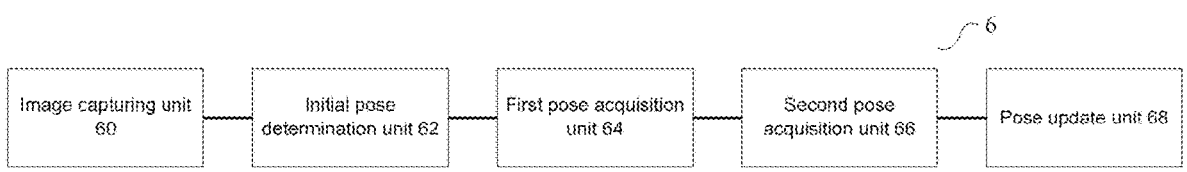
FIG. 6 is a structural block diagram of an optional pose tracking device according to some embodiments of the present disclosure.

According to another aspect of some embodiments of the present disclosure, a pose tracking device is further provided. Referring to FIG. 6, FIG. 6 is a structural block diagram of an optional pose tracking device according to some embodiments of the present disclosure. As shown in FIG. 6, a pose tricking device 6 comprises:

an image capturing unit 60, configured to acquire continuous multiple-frame images of a scanned object.

Optionally, in some embodiments of the present disclosure, the image capturing unit may be an independent camera, or a camera integrated with a camera lens and an electronic device such as a mobile phone, and the type of the camera comprises an infrared structured light camera, a time-of-flight (ToF) camera, an RGB camera, a Mono camera, etc.; and the continuous multiple frame may be continuous RGB-D images, the RGB-D image is an image pair composed of a depth image and a color image, and the depth image and the color image are usually acquired respectively by means of different image capturing units; and it can be assumed that the color image and the depth image of each frame are synchronized in time, and for a color camera and a depth camera with fixed relative position, it is easy to implement data alignment by external parameter calibration to achieve frame synchronization of each color image and depth image by means of time stamps at which the images are acquired.

An initial pose determination unit 62, configured to determine an initial pose of the image capturing unit.

Optionally, in some embodiments of the present disclosure, the initial pose determination unit is further configured to set the initial pose of the image capturing unit as a unit matrix or randomly set same as an arbitrary value, wherein the pose of the image capturing unit comprises a spatial three-dimensional position and an orientation of the image capturing unit, and has six degrees of freedom.

A first pose acquisition unit 64, configured to by taking the initial pose as an initial value, acquire, on the basis of a previous frame image and a current frame image in the continuous multiple-frame images, a first calculated pose of the current frame image by using a first algorithm.

Optionally, in some embodiments of the present disclosure, the first algorithm is a three-dimensional point cloud alignment algorithm based on pixel-by-pixel color alignment, for example, a dense visual odometry (DVO) algorithm. By taking the initial pose as an initial value, pixel-by-pixel color alignment is performed on the previous frame image and the current frame image by using the first algorithm, and a relative coordinate transformation between the previous frame image and the current frame image can be obtained for acquiring a first calculated pose of the current frame image.

A second pose acquisition unit 66, configured to by taking the first calculated pose as an initial value, acquire, on the basis of the current frame image and a current frame image reconstruction model, a second calculated pose of the current frame image by using a second algorithm.

Optionally, in some embodiments of the present disclosure, the second algorithm is an iterative three-dimensional point cloud alignment algorithm, for example, an improved iterative closest point (ICP) algorithm in a KinectFusion algorithm. By taking the first calculated pose as an initial value, the current frame image (for example, a depth image in an RGB-D image) is aligned with the current frame image reconstruction model by using the second algorithm, and a relative coordinate transformation between the previous frame image and the current frame image can be obtained for acquiring a second calculated pose of the current frame image.

A pose update unit 68, configured to update the initial pose of the image capturing unit according to the second calculated pose, to achieve pose tracking of the image capturing unit.

According to the pose tracking device provided in some embodiments of the present disclosure, accurate pose tracking of the image capturing unit can be achieved; in addition, the first pose acquisition unit only involves the previous frame image and the current frame image, being independent of a current frame image reconstruction model, and thus a substantially accurate pose can also be provided when the scanned object deviates from the field of vision, improving the robustness of pose tracking of the image capturing unit.

Optionally, in some embodiments of the present disclosure, in order to increase the calculation efficiency, a three-to-four-layer image pyramid can be established for the RGB-D image, the first algorithm (for example, a DVO algorithm) performs calculation on a low-resolution image, and the second algorithm (for example, an ICP algorithm) performs calculation on a high-resolution image, thereby reducing the complexity of the overall algorithm.

Although the described pose tracking device provided according to some embodiments of the present disclosure has characteristics of high precision and high speed, it is not suitable for cases where an image capturing unit moves fast. when the image capturing unit moves too fast, the content difference between adjacent frame images is too large, a problem of motion blur will occur, which may cause failure of pose tracking of the image capturing unit.

To further improve the robustness of pose tracking of the image capturing unit, the initial pose determination unit 62 may be an inertial navigation module. Optionally, in some embodiments of the present disclosure, the inertial navigation module is an Extended Kalman filter (EKF)-based state estimation system. The inertial navigation module may obtain an initial pose of the image capturing unit through a dynamic integration method by using, as an input, data of an inertial measurement unit (IMU) commonly used in a mobile platform. The inertial measurement unit is a sensor for measuring a motion state by an inertial force. A common inertial measurement unit comprises an accelerometer for acquiring linear acceleration data and a gyroscope for acquiring angular velocity data. Considering that a common inertial measurement unit of a mobile platform has a large noise and a continuously changing offset, the error of a pose of the image capturing unit obtained by calculation directly based on an original measurement value is very large. Therefore, by taking the reading on the inertial measurement unit as a measurement value and using a multisensor fusion method, the prediction of Kalman filtering is completed by solving a dynamic equation, and the predicted pose of the image capturing unit serves as the initial pose of the image capturing unit. By using the multisensor fusion method, measurement results of various sensors and uncertainties can be considered comprehensively to obtain a more accurate state tracking result.

When the initial pose determination unit 62 is the inertial navigation module, the pose update unit 68 is further configured to update a state quantity of the inertial navigation module according to the second calculated pose, to update the initial pose of the image capturing unit.

Taking the inertial navigation module as a pose tracking device of the initial pose determination unit can significantly improve the robustness of pose tracking of the image capturing unit in sharp movement situations. In addition, as the inertial navigation module has a small calculation amount, and compared with a method in which the initial pose of the image capturing unit is set as a unit matrix or randomly set as an arbitrary value, the inertial navigation module can be used to acquire a basically accurate initial pose of the image capturing unit, so that the speed of convergence can be optimized quickly, and the calculation performance can be improved.

The pose tracking device provided according to some embodiments of the present disclosure further comprises: a pose verification unit 67, configured to verify the second calculated pose. Specifically, a comparison image can be acquired from the current frame image reconstruction model, and the comparison image can be compared with the current frame image (for example, the depth image of the current frame image) to achieve verification of the second calculated pose. Acquiring a comparison image from the current frame image reconstruction model may be using a light projection method to render a depth image from the current frame image reconstruction model as a comparison image. After the comparison image is acquired, the comparison image is compared with the depth image of the current frame image, a robust kernel function is used to calculate a weighted mean square error, and then the weighted mean square error is compared with a first threshold to achieve verification of the second calculated pose. when the verification is passed, determining the pose tracking is successful, and the current frame image reconstruction model is updated by using the second calculated pose and the current frame image. Otherwise, determining tracking of the image capturing unit fails, and the quantities of state of the reconstruction model and the inertial navigation module are not updated.

Thus, by updating the current frame image reconstruction model by using the second calculated pose and the current frame image, a three-dimensional model of the scanned object can be reconstructed.

Although the described inertial navigation module-based pose tracking device significantly improves the robustness of tracking of an image capturing unit in situations such as sharp movement, the problem of pose tracking loss is still inevitable in cases where a user blocks a camera or a scene changes obviously.

in order to quickly resume pose tracking of an image capturing unit in the case of tracking loss, and reestimate the pose of the image capturing unit to further improve robustness of pose tracking of the image capturing unit, and improve the user experience, the described pose verification unit is further configured to select, when the verification is passed, a key frame image from frame images for which the verification is passed; construct a bag of words database on the basis of the selected key frame image; and resume, when the verification fails, tracking of the image capturing unit by using a relocation method. For example, when the verification fails, the current frame image can be marked as tracking failure; and when the number of frame images of continuous tracking failure exceeds a second threshold, it indicates that the pose tracking of the image capturing unit is lost, tracking of the image capturing unit is resumed by using the relocation method of the image capturing unit.

Optionally, in some embodiments of the present disclosure, the relocation method may comprise matching between feature points and bag of words (BoVV) to achieve quick resuming of pose tracking of the image capturing unit in the case of pose tracking lost. The bag of words is a method for describing image features by using picture feature point descriptors.

Optionally, in some embodiments of the present disclosure, when the verification is passed, selecting a key frame image from the frame images for which the verification is passed comprises: when the verification is passed, according to the second calculated pose, at every certain angle and distance, selecting, as the key frame image, a clearest frame from several adjacent frame images for which the verification is passed. For definition of an image, a low-pass filter can be used to perform smoothing processing on the image to obtain a blurred image. By comparing the difference between the original image and the blurred image, the blurriness of the blurred image can be obtained. The closer the original image is to the blurred image, the more blurred the original image itself is.

Optionally, in some embodiments of the present disclosure, constructing a bag of words database on the basis of the selected key frame image comprises: on the basis of the selected key frame image, extracting image feature points, calculating feature point descriptors and bag of words vectors, and constructing same into the bag of words database. The described bag of words database can be constructed in an offline manner, and an offline bag of words database is trained from a group of image sample sets by using a manner similar to text retrieval. Image features are similar to words, and the whole bag of words database is similar to a dictionary. By means of the dictionary, for any one feature, a word corresponding thereto can be found in the dictionary. First, image features and descriptors of each sample in the image sample sets are calculated, then the image features are clustered into words according to a Kmeans++ algorithm and divided into K types of subspaces, and clustering continues to be performed on the divided subspaces by using the Kmeans++ algorithm. According to the described cycle, the descriptors are clustered into a tree structure, wherein the whole tree structure constitutes the dictionary, and leaf nodes (also referred to as word nodes) of the tree constitute the words. Moreover, in the dictionary establishment process, for each word, the frequencies of occurrence of the word in all training images are also recorded, and the higher the frequency of occurrence is, the smaller the degree of discrimination of the word is to describe the degree of discrimination of image feature represented by the word.

Optionally, in some embodiments of the present disclosure, when the verification fails, resuming tracking of the image capturing unit by using a relocation method comprises: when the pose tracking is lost, a bag of words vector of the current frame image is calculated; a candidate key frame image is selected according to the constructed bag of words database and the bag of words vector of the current frame image; a relative pose between the candidate key frame image and the current frame image is calculated, and a third calculated pose of the current frame image is acquired; and the initial pose of the image capturing unit is updated according to the third calculated pose, to resume pose tracking of the image capturing unit.

In cases where pose tracking of the image capturing unit is lost, as the inertial navigation module cannot obtain feedback of a visual positioning module for a long time, the system state thereof is very likely to deviate far from a real value. To this end, when the relocation is successful and pose tracking of the image capturing unit is resumed, the inertial navigation module needs to be re-initialized, which comprises setting external parameters, offsets and variance matrices of the inertial navigation module as default values, and the pose of the current image capturing unit is used to reversely obtain an initial pose of the inertial navigation module, etc.

Embodiment V

Figure 7:
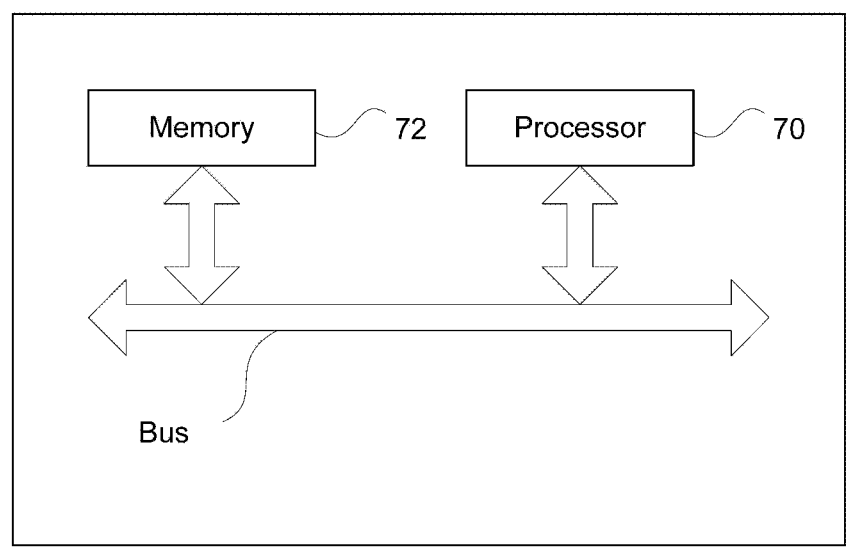
FIG. 7 is a structural block diagram of an optional electronic device according to some embodiments of the present disclosure.

According to another aspect of some embodiments of the present disclosure, an electronic device is further provided. Referring to FIG. 7, FIG. 7 is a structural block diagram of an optional electronic device according to some embodiments of the present disclosure. As shown in FIG. 7, an electronic device 7 comprises: a processor 70; and a memory 72, configured to store executable instructions of the processor 70; wherein the processor 70 is configured to execute the pose tracking method according to any one of Embodiment I to Embodiment III by executing the executable instructions.

Embodiment VI

According to another aspect of some embodiments of the present disclosure, a storage medium is further provided, wherein the storage medium comprises a stored program, wherein the program, when running, controls a device where the storage medium is located to execute the pose tracking method according to any one of Embodiment I to Embodiment III.

The sequence number of the embodiments above of the present disclosure are only for description, but do not denote the preference of the embodiments.

In the described embodiments of the present disclosure, the description of each embodiment has its own emphasis. For the part not detailed in a certain embodiment, please refer to the relevant description of other embodiments.

In the several embodiments provided in the present disclosure, it should be understood that the disclosed technical content may be implemented in other manners. The apparatus embodiment described above is only schematic. For example, the division of the unit can be logical functional division, and there can be other division methods in the actual implementation, for example, multiple units or components can be combined or integrated into another system, or some features can be ignored or not executed. In addition, the mutual coupling or direct coupling or communication connection shown or discussed may be indirect coupling or communication connection through some interfaces, units or modules, and may be in the form of electricity or other forms.

The units described as separate components may or may not be physically separated, and the components displayed as units may or may not be physical units, that is, may be located in one place, or may be distributed to a plurality of units. Some or all units can be selected according to the actual needs to achieve the purpose of the solutions of the embodiments.

In addition, functional units in the embodiments of the present disclosure may be integrated into one processing unit, or the units may exist alone physically, or two or more units are integrated into one unit. The integrated unit may be implemented in the form of hardware, and may also be implemented in the form of a software functional unit.

When the integrated unit is implemented in the form of a software functional unit and is sold or used as an independent product, the integrated unit can be stored in a computer-readable storage medium. On the basis of such understanding, the part of the technical solutions of some embodiments of the present disclosure that contributes in essence or to the prior art or all or part of the technical solutions may be embodied in the form of a software product stored in a storage medium. Several instructions are included in the storage medium to cause a computer device (which may be a personal computer, server or network device, etc.) to execute all or some of the steps of the methods of various embodiments of the present disclosure. The described storage media comprises USB flash disk, Read-Only Memory (ROM), Random Access Memory (RAM), mobile hard disk, magnetic disc or optical disk, etc., which can store program codes.

The description above only relates to preferred embodiments of the present disclosure. It should be noted that for a person of ordinary skill in the present technical field, several improvements and modifications can also be made without departing from the principle of some embodiments of the present disclosure, and these improvements and modifications shall also be considered as within the scope of protection of some embodiments of the present disclosure.

INDUSTRIAL APPLICABILITY

By acquiring continuous multiple-frame images of a scanned object and an initial pose of an image capturing unit; by taking the initial pose as an initial value, acquiring, on the basis of a previous frame image and a current frame image in the continuous multiple-frame images, a first calculated pose of the current frame image by using a first algorithm; by taking the first calculated pose as an initial value, acquiring, on the basis of the current frame image and a current frame image reconstruction model, a second calculated pose of the current frame image by using a second algorithm; and updating the initial pose of the image capturing unit according to the second calculated pose, and repeating the described steps to achieve pose tracking of the image capturing unit, not only the pose of the image capturing unit can be accurately estimated, but also a substantially accurate pose can be provided when the scanned object deviates from the field of vision, thereby improving the robustness of pose tracking of the image capturing unit. And thus the problem in the prior art that tracking loss easily occurs due to poor robustness of pose tracking is solved.

Moreover, in cases where the camera tracking is lost, effective scene regain can be provided through the relocation method, and the pose tracking of the image capturing unit can be quickly resumed. In addition, the described pose tracking method is particularly suitable for a mobile platform: on the one hand, the method makes full use of a variety of sensor devices commonly used in a mobile platform; and on the other hand, the method has relatively low calculation cost, and satisfies the real-time calculation performance requirements of the mobile platform.

What is claimed is:

1. A pose tracking method, the method comprising the following steps:

acquiring continuous multiple-frame images of a scanned object and an initial pose of an image capturing unit;

by taking the initial pose as an initial value, acquiring, on the basis of a previous frame image and a current frame image in the continuous multiple-frame images, a first calculated pose of the current frame image by using a first algorithm;

by taking the first calculated pose as an initial value, acquiring, on the basis of the current frame image and a current frame image reconstruction model, a second calculated pose of the current frame image by using a second algorithm; and updating the initial pose of the image capturing unit according to the second calculated pose, and repeating acquiring continuous multiple frames and the initial pose, acquiring the first calculated pose, acquiring the second calculated pose, and updating the initial pose to achieve pose tracking of the image capturing unit.

2. The method as claimed in claim 1, wherein the initial pose of the image capturing unit is set as a unit matrix or randomly set as an arbitrary value.

3. The method as claimed in claim 1, wherein the continuous multiple-frame images are continuous Red Green Blue-Depth (RGB-D) images.

4. The method as claimed in claim 1, wherein by taking the initial pose as the initial value, acquiring, on the basis of the previous frame image and the current frame image in the continuous multiple-frame images, the first calculated pose of the current frame image by using the first algorithm comprises: by taking the initial pose as the initial value, performing pixel-by-pixel color alignment on the previous frame image and the current frame image by using the first algorithm, to obtain a relative coordinate transformation between the previous frame image and the current frame image for acquiring a first calculated pose of the current frame image.

5. The method as claimed in claim 1, wherein by taking the first calculated pose as the initial value, acquiring, on the basis of the current frame image and the current frame image reconstruction model, the second calculated pose of the current frame image by using the second algorithm comprises: by taking the first calculated pose as the initial value, performing three-dimensional point cloud alignment on the current frame image and the current frame image reconstruction model by using the second algorithm, to obtain a relative coordinate transformation between the previous frame image and the current frame image for acquiring a second calculated pose of the current frame image.

6. The method as claimed in claim 1, wherein the first algorithm is used for performing calculation on a low-resolution image, and the second algorithm is used for performing calculation on a high-resolution image.

7. The method as claimed in claim 1, wherein the initial pose of the image capturing unit is acquired by means of an inertial navigation module.

8. The method as claimed in claim 7, wherein a state quantity of the inertial navigation module is updated according to the second calculated pose, to update the initial pose of the image capturing unit.

9. The method as claimed in claim 7, wherein the initial pose of the image capturing unit is acquired by means of the inertial navigation module by using a multisensor fusion method.

10. The method as claimed in claim 7, wherein the inertial navigation module is an extended Kalman filter-based state estimation system.

11. The method as claimed in claim 1, wherein the method further comprises: verifying the second calculated pose, and when the verification is passed, updating the current frame image reconstruction model by using the second calculated pose and the current frame image.

12. The method as claimed in claim 11, wherein verifying the second calculated pose comprises: acquiring a comparison image from the current frame image reconstruction model, and comparing the comparison image with the current frame image, to achieve verification of the second calculated pose.

13. The method as claimed in claim 11, wherein the method further comprises:
when the verification is passed, selecting a key frame image from frame images for which the verification is passed; and
constructing a bag of words database on the basis of the selected key frame image.

14. The method as claimed in claim 13, wherein the method further comprises: when the verification fails, determining whether pose tracking of the image capturing unit is lost, and resuming pose tracking of the image capturing unit by using a relocation method.

15. The method as claimed in claim 14, wherein determining whether pose tracking of the image capturing unit is lost comprises: marking the current frame image as tracking failure; and when the number of frame images of continuous tracking failure exceeds a second threshold, determining the pose tracking of the image capturing unit is lost, and resuming pose tracking of the image capturing unit by using the relocation method.

16. The method as claimed in claim 14, wherein the relocation method comprises:
when the pose tracking is lost, calculating a bag of words vector of the current frame image;
selecting a candidate key frame image according to the constructed bag of words database and the bag of words vector of the current frame image;
calculating a relative pose between the candidate key frame image and the current frame image, and acquiring a third calculated pose of the current frame image; and
updating the initial pose of the image capturing unit according to the third calculated pose, to resume pose tracking of the image capturing unit.

17. The method as claimed in claim 14, further comprising:
initializing the inertial navigation module after resuming pose tracking of the image capturing unit.

18. A pose tracking device, an apparatus comprising:
an image capturing unit, configured to acquire continuous multiple-frame images of a scanned object;
an initial pose determination unit, configured to determine an initial pose of the image capturing unit;
a first pose acquisition unit, configured to by taking the initial pose as an initial value, acquire, on the basis of a previous frame image and a current frame image in the continuous multiple-frame images, a first calculated pose of the current frame image by using a first algorithm;
a second pose acquisition unit, configured to by taking the first calculated pose as an initial value, acquire, on the basis of the current frame image and a current frame image reconstruction model, a second calculated pose of the current frame image by using a second algorithm; and
a pose update unit, configured to update the initial pose of the image capturing unit according to the second calculated pose, to achieve pose tracking of the image capturing unit.

19. The apparatus as claimed in claim 18, wherein the initial pose determination unit is further configured to set the initial pose of the image capturing unit as a unit matrix or randomly set same as an arbitrary value.

20. An electronic device, comprising:
a processor; and
a memory, configured to store executable instructions of the processor;

wherein the processor is configured to execute the pose tracking method according to claim 1 by executing the executable instructions.

\* \* \* \* \*